… …

United States Patent [19]
Holzman et al.

[11] 4,050,243
[45] Sept. 27, 1977

[54] COMBINATION SOLID FUEL RAMJET INJECTOR/PORT COVER

[75] Inventors: Allen L. Holzman; William J. Corcoran, both of Palo Alto, Calif.

[73] Assignee: The United States of America as represented by the Secretary of the Navy, Washington, D.C.

[21] Appl. No.: 687,055

[22] Filed: May 17, 1976

[51] Int. Cl.² ............ F02K 9/04; F02B 27/02
[52] U.S. Cl. .................... 60/245; 60/250; 60/251; 60/270 S; 137/15.2; 137/533.21; 251/325
[58] Field of Search ........ 60/250, 251, 270 S, 60/270 R, 245; 137/15.1, 15.2, 72, 533.21, 538; 251/82, 83, 325

[56] References Cited

U.S. PATENT DOCUMENTS

| 1,466,171 | 8/1923 | Jacobsen | 137/533.21 |
| 2,206,356 | 7/1940 | Hutchings | 137/538 |
| 2,928,417 | 3/1960 | Buckner et al. | 137/538 |
| 3,218,974 | 11/1965 | Samms | 60/250 |
| 3,555,826 | 1/1971 | Bennett | 60/251 |
| 3,654,950 | 4/1972 | Hamm | 251/325 |
| 3,803,837 | 4/1974 | Curran | 60/245 |
| 3,844,118 | 10/1974 | Wilkinson | 60/251 |
| 3,879,942 | 4/1975 | Dorn et al. | 60/250 |
| 3,943,969 | 3/1976 | Rubin | 137/538 |

FOREIGN PATENT DOCUMENTS

| 590,177 | 7/1947 | United Kingdom | 60/245 |

*Primary Examiner*—Carlton R. Croyle
*Assistant Examiner*—Robert E. Garrett
*Attorney, Agent, or Firm*—R. S. Sciascia; Roy Miller

[57] ABSTRACT

A combination injector/port cover for a solid fuel ramjet (SFRJ) having a tube-in-hole injector which uses two seals to lock the tube into the air inlet and injector port during the boost phase, and which moves the tube into the combustion chamber during transition to the sustain phase.

4 Claims, 3 Drawing Figures

COMBINATION SOLID FUEL RAMJET INJECTOR/PORT COVER

BACKGROUND OF THE INVENTION

The present invention relates to solid fuel ramjets, and more particularly to a tube-in-hole combination injector and port cover.

One of the requirements of an integral rocket-ramjet (IRR) is to separate the low pressure air manifold system from the combustion chamber during the high pressure solid booster operation. This usually requires an ejectable port cover that is eliminated during the transition period between solid propellant booster tailoff and SFRJ sustain ignition. However, it is always desirable to eliminate ejecta and improve reliability by reducing parts flying within the motor during transition.

SUMMARY OF THE INVENTION

The present invention provides a tube-in-hole injector which is modified to act as both an inlet air flow smoother/recirculating zone stabilizer and as a simple port cover. The tube is movable translatably such that during the boost phase it is positioned to block the air inlets to the ramjet motor. O-rings provide the appropriate seals between the combustion chamber and the air inlets. When the boost pressure developed by the boost solid propellant decays, the air inlet pressure forces the tube into the injector port to open the air inlets.

DESCRIPTION OF A PREFERRED EMBODIMENT

Figure 1:
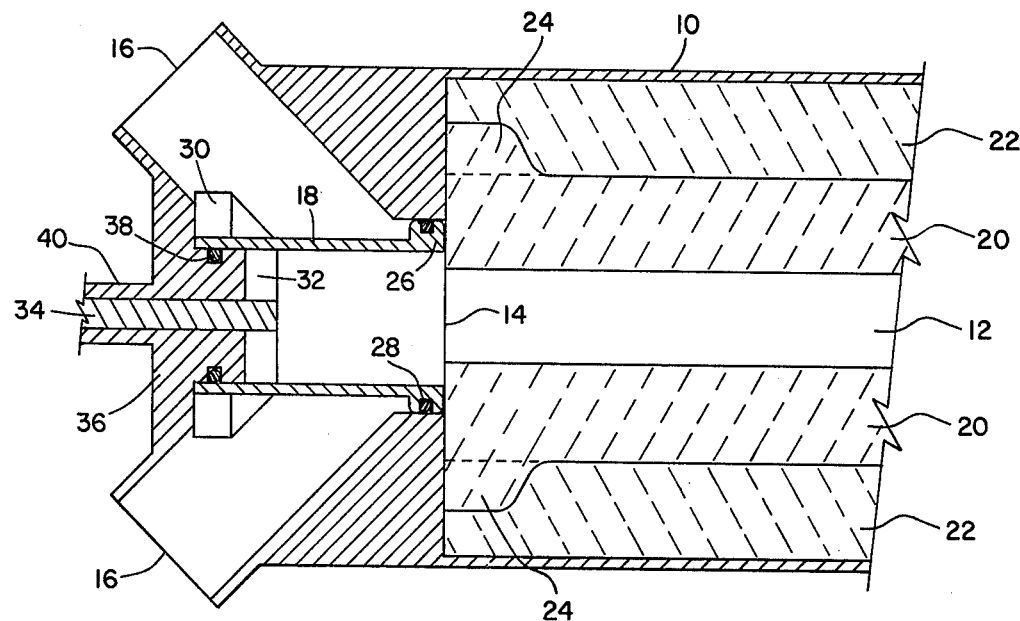
FIG. 1 is a cross sectional view of the present invention during the boost phase.

Referring now to FIG. 1, an integral rocket-ramjet (IRR) 10, having a combustion chamber 12, an injector port 14, and air inlets 16, has a tube injector 18 positioned during the boost phase to block the air inlets. Boost solid fuel 20 and sustain fuel 22 are cast within the combustion chamber 12, with the sustain fuel lining the wall of the combustion chamber and the boost solid fuel contiguous to the sustain fuel, forming an interior cavity where combustion occurs. An igniter propellant region 24 is created at the injector port end of the fuel system to reduce the ramjet critical injection parameter (see copending U.S. patent application Ser. No. 702,338, filed July 6, 1976 entitled "A Method for Reducing the Critical Injection Parameter of a Ramjet" by Allen L. Holzman).

Figure 3:
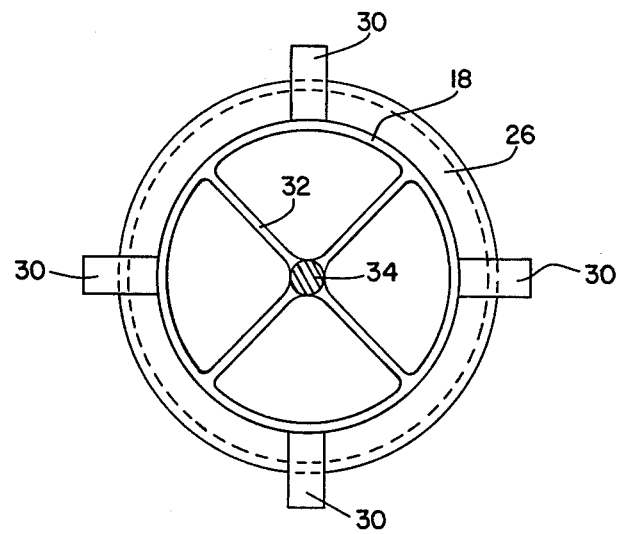
FIG. 3 is an end view of the combination injector/port cover.

The tube injector 18, shown in an end view in FIG. 3, has an annular nub 26 at the downstream end with a circumferential slot within which an O-ring seal 28 is seated, the outside diameter of the nub being greater than the outside diameter of the tube injector. At the upstream end of the tube injector 18 and mounted on the outside diameter are cross stops 30 which limit the movement of the tube injector into the injector port 14 during the sustain phase. Interior to the tube injector 18 and near the upstream end is a spider 32 on which is mounted a centering shaft 34.

A step 36 within the air inlets 16, which step could be part of a central body/shock spike or a forward bulkhead, has a circumferential slot with a second O-ring seal 38 such that during the boost phase the interior of the upstream end of the tube injector 18 fits over the step to form a seal with the second O-ring, with the spider 32 flush to the face of the step. A centering shaft housing tube 40 is provided through the step 36 in which the centering shaft 34 of the tube injector 18 is slidably mounted.

During the boost phase the tube injector 18 is in an upstream position as shown in FIG. 1, with the nub 26 and its associated O-ring 28 sealing the injector port 14, and with the upstream end fitted over the step 36 and its associated O-ring 38 sealing the tube injector so that the air inlets 16 are sealed from the combustion chamber 12. This creates a light-weight isolator of the 1500–2000 psi boost pressure in the combustion chamber 12 from the stagnated 50–150 psi air inlet system.

Figure 2:
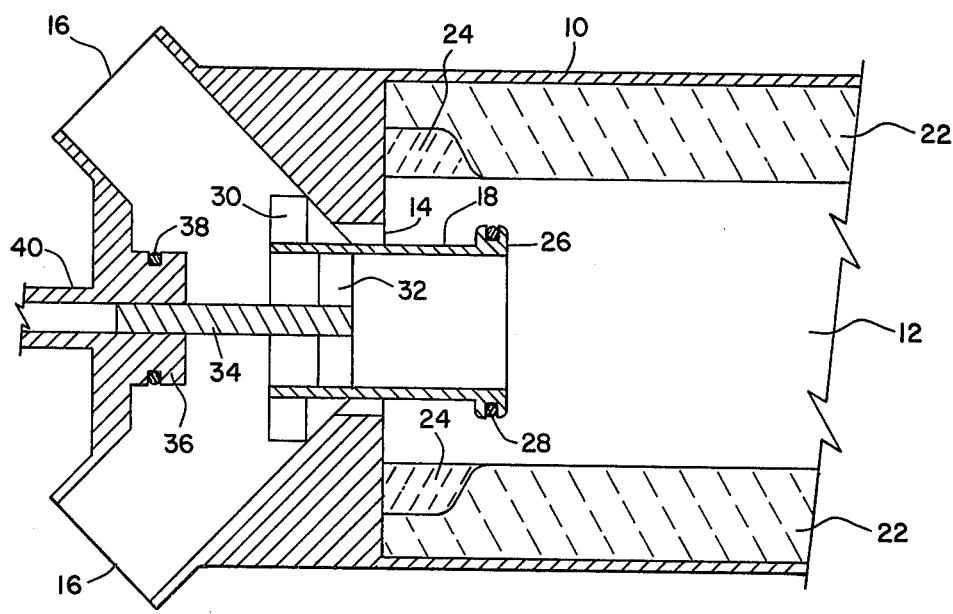
FIG. 2 is a cross-sectional view of the present invention during the sustain phase.

The differential area between the outside diameter of the nub 26 and the outside diameter of the tube injector 18 is sufficient with the air manifold stagnation pressure driving force to move the tube injector downstream into the combustion chamber 12, as shown in FIG. 2, when the decaying booster pressure falls below the design value. The centering shaft 34 keeps the tube injector 18 centered in the injector port 14, with the cross stops 30 acting as limiters to prevent the tube injector from moving too far into the combustion chamber 12. The placement of the O-rings 28, 38 can adjust the pressure differential required for the movement of the tube injector 18. The nub 26 has no effect on the ramjet performance or injector pressure drop. (See copending U.S. patent application Ser. No. 712,421, filed Aug. 6, 1976 entitled "Split Flow Injector for Solid Fuel Ramjets" by John M. Humphrey and Allen L. Holzman for description of effects of a tube injector upon ramjet operation.) If desired, a squib or pressurized piston can eject the tube injector into the combustion chamber 12 on command.

The present invention thus provides a light weight injector port cover with no ejecta. It is reliable and does not add to the cost since reliable O-ring seals are used with no moving parts added for the injector port cover itself. Finally, the operation of the tube injector/port cover can easily be checked before casting the boost solid fuel.

What is claimed is:

1. An improved integral rocket-ramjet of a type in which a dual fuel system is burned in a combustion chamber having a nozzle at one end thereof, defined as the rear end, through which the gases of combustion are ejected to create thrust, one fuel of the dual fuel system containing sufficient oxygen to support combustion, the other fuel requiring air to support combustion, and having an injector port at the other end, defined as the forward end, of the combustion chamber and air inlet ports forward of said injector port and in communication with the outside atmosphere such that in flight, ram air enters the air inlet ports, wherein the improvement comprises;

a tube injector slidably mounted for axial movement in said injector port for translation from a first position during a boost phase when the fuel containing oxygen is combusting to a second position during a sustain phase when the fuel requiring air for combustion is combusting;

said tube injector comprising a substantially hollow cylinder having an annular nub at one end;

said annular nub having an outside diameter greater than said cylinder and essentially the same diameter as the inner diameter of said injector port;

an axially extending cylindrical step forwardly of said injector port and constituting a part of said rocket-ramjet;

the other end of said tube injector being supported interiorly on said axially extending cylindrical step;

the interior diameter of said tube injector conforming essentially to the exterior diameter of the step;

sealing means associated with said annular nub and said injector port;

other sealing means associated with said step and the interior circumference of said tube injector;

said sealing means and other sealing means in cooperation with said tube injector, step and injector port being operative to prevent outside air from entering the combustion chamber during the boost phase when said tube injector is in said first position;

stop means exteriorly mounted near the other end of said tube injector and having a dimension greater than the diameter of the injector port and adapted to abut the injector port and limit the axial travel of said tube injector when said tube injector moves to the second position;

centering means interiorly attached to said tube injector near said other end and having a portion thereof extending axially;

said step having a central bore extending therethrough;

said portion being carried and guided by said central bore in said step; and means for moving said tube injector from said first position to said second position during transition from said boost phase to said sustain phase.

2. An improved integral rocket-ramjet as set forth in claim 1 wherein;

said nub on said tube injector has a surface area thereon defined by the difference in diameters between the nub and said cylindrical portion of said tube injector such that a differential pressure applied to said tube injector will cause it to move from said boost to said sustain position;

said differential pressure resulting from the difference between a combustion pressure caused by gases from the combustion of the fuel system acting on an area defined by the diameter of the cylindrical portion of the tube injector and an ambient air pressure caused by airflow through the air inlet ports acting on an area defined by the diameter of the nub such that during the boost phase the differential pressure maintains said tube injector at said first position and during transition from the boost to sustain phase said differential pressure causes said tube injector to move to said second position.

3. An improved integral rocket-ramjet as set forth in claim 1 wherein;

said sealing means and other sealing means comprise "O" ring seals circumferentially located in slots in the nub and step respectively.

4. An improved integral rocket-ramjet as set forth in claim 1 wherein;

said centering means comprises a centering shaft having its axis coextensive with the axis of said tube injector and said central bore of the step;

said shaft being of a length such that the shaft is maintained in said central bore in both the boost and sustain phases thereby maintaining said tube injector axially aligned in said injector port in both the first and second positions.

* * * * *